United States Patent [19]
McKinley

[11] 3,820,029
[45] June 25, 1974

[54] PRECISION VOLTAGE CONTROL MONOSTABLE MULTIVIBRATOR

[75] Inventor: Ronnie Jack McKinley, Longview, Tex.

[73] Assignee: Halliburton Company, Duncan, Okla.

[22] Filed: May 15, 1973

[21] Appl. No.: 360,577

[52] U.S. Cl. .................... 328/58, 307/265, 307/273, 328/207
[51] Int. Cl. .............................................. H03k 5/04
[58] Field of Search ........... 307/265, 266, 267, 273; 328/58, 207

[56] References Cited

UNITED STATES PATENTS

| | | | |
|---|---|---|---|
| 2,605,405 | 7/1952 | Lentz | 328/58 |
| 3,387,221 | 6/1968 | Arberman et al | 307/265 |
| 3,465,174 | 9/1969 | Soltz | 307/265 |
| 3,484,624 | 12/1969 | Rasiel et al. | 307/265 |
| 3,532,993 | 10/1970 | Kennedy | 307/265 |
| 3,555,298 | 1/1971 | Neelands | 307/265 |
| 3,718,827 | 2/1973 | Ragsdale | 307/265 |
| 3,742,257 | 6/1973 | Wittenzeller | 307/265 |

*Primary Examiner*—Stanley D. Miller, Jr.
*Attorney, Agent, or Firm*—Burns, Doane, Swecker & Mathis

[57] ABSTRACT

A circuit for providing, when triggered, an output pulse of substantially constant amplitude and a duration linearly variable from zero to a predetermined maximum as a function of the amplitude of a control voltage variable from zero to a predetermined maximum. In the preferred embodiment, means are provided to produce a negative pulse of predetermined duration and a longer pulse having a duration equal to the sum of the predetermined duration and a duration related to the value of a control voltage. The two pulses are algebraically summed to provide an output pulse having a duration equal to the difference in duration and thus related solely in duration to the value of the control voltage.

8 Claims, 5 Drawing Figures

PRECISION VOLTAGE CONTROL MONOSTABLE MULTIVIBRATOR

BACKGROUND OF THE INVENTION

The prior art is replete with voltage control monostable multivibrators and the applications for variable width pulse generators are legion. These generally known variable width pulse generators have suffered from the common disadvantage of an inability to provide an output pulse of zero width when triggered in the absence of a control signal.

Prior art attempts to solve this problem have included monostable multivibrators such as disclosed in the Raisel et al U.S. Pat. No. 3,484,624 issued December 16, 1969. In such multivibrators, an output pulse is initiated and a switch is utilized to control the charging of a capacitor from a constant current source to thereby generate a linearly increasing ramp voltage. This ramp voltage is generally applied to a comparator for comparison with a control voltage. Equality of the two voltages is then utilized to reset the switch and thereby terminate the output pulse. No provision is, however, made in multivibrators of this type to maintain the reference voltage of the comparator above the minimum operable limit of the comparator and this minimum operable limit of the comparator remains a source of error.

Other multivibrators such as that disclosed in the Neelands U.S. Pat. No. 3,555,298 issued January 12, 1971, also apply a ramp voltage to a comparator for comparison with a control voltage. In such systems, an output pulse is initiated with the initiation of the ramp voltage which increases only to the voltage level of the control signal, and the voltage is then linearly reduced by a constant current generator. No compensation is generally made for the effects of the reference voltage on the pulse width of the output signal.

It is accordingly an object of the present invention to obviate the deficiencies of known prior art variable width monostable multivibrators and to provide a novel monostable multivibrator and method.

Another object of the present invention is to provide a novel method and variable pulse width generator which is responsive to a control signal variable from zero to a predetermined maximum to provide an output pulse variable in duration from zero to a predetermined maximum.

A further object of the present invention is to provide a novel method and monostable multivibrator which provides compensation for the minimum operable limits of the circuit elements.

Yet a further object of the present invention is to provide a novel method and monostable multivibrator having an output pulse linearly variable as a function of a control voltage without a minimum pulse width limit.

These and many other objects and advantages of the present invention will be apparent to one skilled in the art to which the invention pertains from the claims and from a perusal of the following detailed description of a preferred embodiment when read in conjunction with the appended drawings.

THE DRAWINGS

THE DETAILED DESCRIPTION

Figure 1:
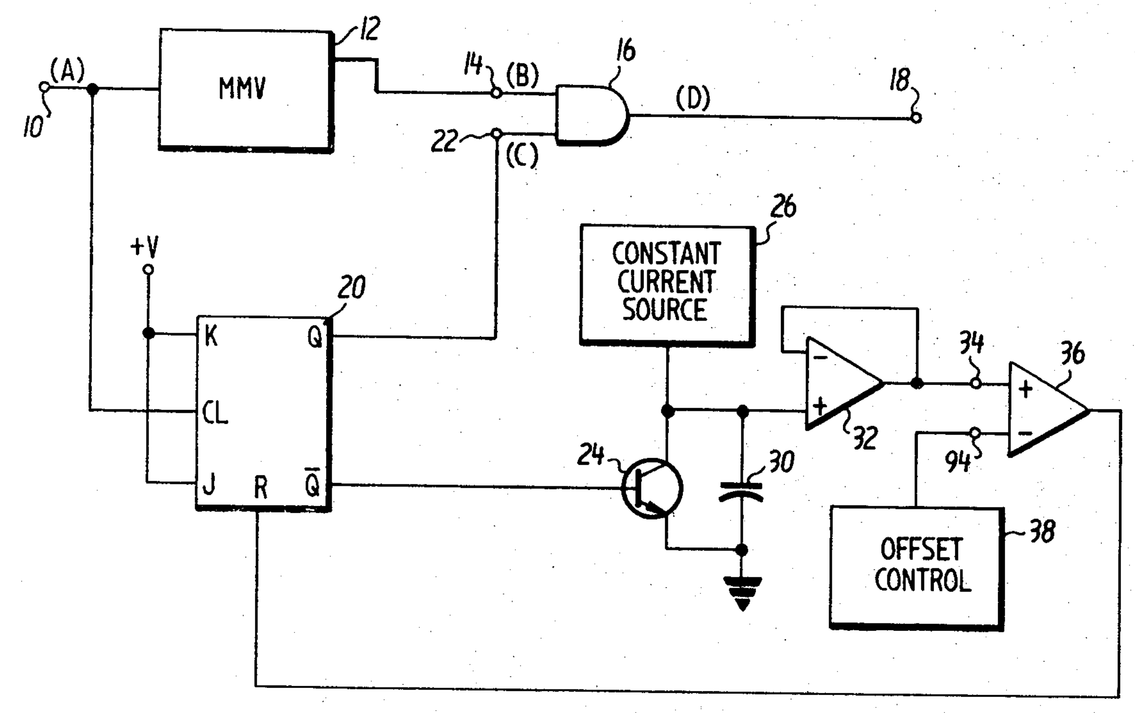
FIG. 1 is a functional block diagram of the preferred embodiment of the circuit of the present invention.

With reference to FIG. 1, an input terminal 10 is connected to the trigger input terminal of a monostable multivibrator 12 and the false output terminal thereof is connected to one input terminal 14 of a two input terminal AND gate 16. The output terminal of the AND gate 16 may be directly connected to an output terminal 18 of the circuit.

The input terminal 10 is also connected to the clock input terminal CL of a conventional JK flip-flop 20 to which a positive voltage is applied to the steering input terminals J and K. The true output terminal Q of the flip-flop 20 is connected to the other input terminal 22 of the AND gate 16 earlier described.

The false output terminal $\overline{Q}$ of the binary element or flip-flop 20 is connected to the control terminal of a suitable conventional electronic switch illustrated in FIG. 1 as the base electrode of an NPN transistor 24. As illustrated, the emitter electrode of the transistor 24 is grounded and the collector electrode thereof is connected to a constant current source 26. The emitter electrode of the transistor 24, and thus the constant current source 26, is also connected by way of a terminal 28 across a capacitor 30 or other suitable conventional integrator to ground potential.

The terminal 28 (not labeled in FIG. 1) is connected to the positive or noninverting input terminal of a suitable conventional voltage comparator or differential amplifier 32 having its output terminal 34 directly connected to the negative or inverting input terminal thereof. The output terminal 34 of the comparator 32 may also be connected to the positive input terminal of a similar suitable conventional comparator 36 to which an offset control circuit 38 is connected by way of the negative input terminal thereof. The output terminal of the comparator 36 may be directly connected to the reset input terminal R of the flip-flop 20.

Figure 2:
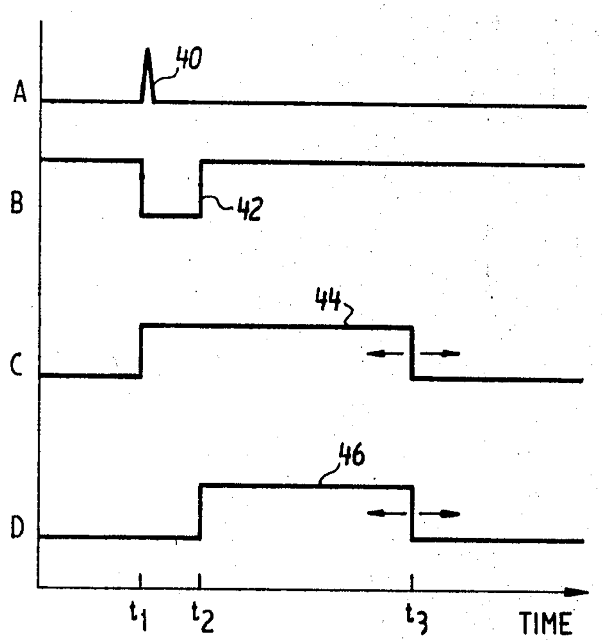
FIG. 2 is a timing diagram illustrating waveforms at various places in the functional block diagram of FIG. 1.

In operation, and with reference to the waveforms illustrated in FIG. 2, the application of a trigger pulse 40 as illustrated in FIG. 2A to the input terminal 10 of the circuit of FIG. 1 will trigger the multivibrator 12 to provide a negative pulse of predetermined amplitude and duration at the false output terminal thereof. This negative pulse is illustrated in FIG. 2 as waveform B and is applied to the input terminal 14 of the AND gate 16 for the time interval $T_1$—$T_2$.

The pulse 40 in waveform A which triggers the multivibrator 12 also triggers the JK flip-flop 20 by virtue of the positive steering voltage to provide a positive pulse on the true output terminal Q thereof. As illustrated in FIG. 2C, a positive pulse from the true output terminal of the flip-flop 20 is variable in duration and exists from the triggering of the flip-flop at time $T_1$ until the flip-flop 20 is reset at time $T_3$. The application of waveform C to the other input terminal 22 of the AND gate 16 produces a positive pulse 46 having a duration coexistent with the high signal levels of waveform B and waveform C, i.e., from the termination of pulse 42 of waveform B at time $T_2$ until the flip-flop 20 is reset at time $T_3$.

The clocking of the flip-flop 20 to provide the pulse 44 of waveform C produces a complementary or low signal level signal on the false output terminal $\overline{Q}$ of the flip-flop 20. This negative pulse is applied to the base electrode of the NPN transistor 24 to drive the transistor into cutoff from the conduction state to which it is normally biased. With the transistor 24 acting as an open circuit, current from the source 26 is no longer shunted from the capacitor 30, and capacitor 30 charges at a linear rate.

The charge on the capacitor 30 is applied through the comparator 32 which acts as a buffer to the positive input terminal of the comparator 36 for comparison with the control signal from the offset control circuit 38 hereinafter described in greater detail in connection with FIG. 4. When the charge on the capacitor 30 reaches the value of the control signal, comparator 36 produces an output signal which resets the flip-flop 20 and terminates the pulse 44 of waveform C. The resetting of the flip-flop 20 removes the low level signal from the false output terminal $\overline{Q}$ of the flip-flop 20 to effect the conduction of the transistor 24 and thus remove the charge from the capacitor 30 in preparation of the next triggering pulse in waveform A.

As is well known, the comparator 36 will not function reliably for a control voltage less than approximately 0.3 volts d.c. and provision is made to ensure that the minimum control voltage is in excess of this value. The time required for the charge on the capacitor 30 to reach this predetermined minimum value can be readily calculated given the amplitude of the current from the source 26. The circuit parameters are desirably adjusted to provide an output pulse from waveform C of approximately 10 microseconds. The adjustment of the width of the pulse 42 in waveform B to this 10 microsecond value provides compensation for the 0.3 volt d.c. offset of the comparator and ensures a constant 10 microsecond reduction in the width of the output pulse 46 of waveform D. The width of the output pulse from the multivibrator 12 may be made slightly longer in duration than the minimum width of the pulse 44 of waveform C thereby ensuring the nonoperation of the AND gate 16.

Figure 3:
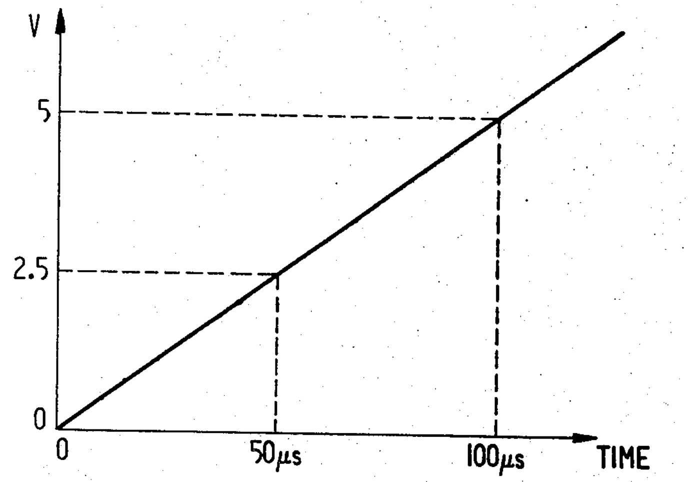
FIG. 3 is a graph of the control voltage plotted against the duration of the output pulse of the circuit of FIG. 1.

As illustrated in FIG. 3, the duration of the output pulse 46 appearing at the output terminal 18 of the circuit of FIG. 1 may be very linear with respect to the amplitude of the control voltage within the permitted range which includes zero.

Figure 4:
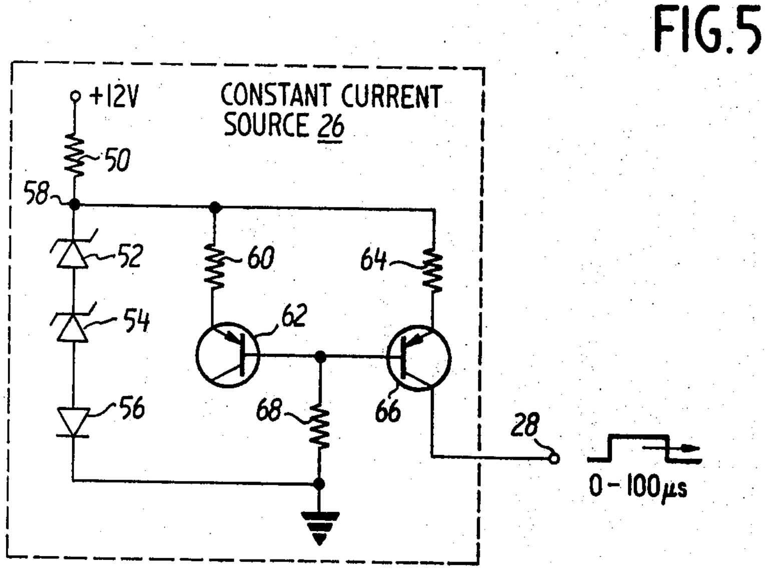
FIG. 4 is a schematic circuit diagram of the constant current source of the circuit of FIG. 1; and, FIG. 5 is a schematic circuit diagram of the offset control circuit of the circuit of FIG. 1.

With reference now to FIG. 4, the constant current source 26 of FIG. 1 may include the series connection of a resistor 50, Zener diodes 52 and 54, and a temperature compensating diode 56 between a source of a positive 12 volt potential and ground. The terminal 58 interconnecting the resistor 50 and the Zener diode 52 may be connected through a resistor 60 to the emitter electrode of a PNP transistor 62 and through a resistor 64 to the emitter electrode of a PNP transistor 66. The base electrodes of the transistors 62 and 66 may be connected through a common resistor 68 to ground potential with the collector electrode of the transistor 62 open circuited and the collector electrode of the transistor 66 providing the output signal on terminal 23 of the circuit of FIG. 1.

In operation, the resistor 50 and the Zener diodes 52 and 54 act as a voltage divider between the source of 12 volt positive potential and ground with the Zener diodes 52 and 54 stabilizing the voltage at terminal 58. The diode 56 is included for temperature stabilization and the transistor 62 serves the same purpose in adjusting the bias of the base electrode of the transistor 66 and thus the conduction thereof.

Exemplary values for the circuit components of FIG. 4 are as follows:

| | |
|---|---|
| resistor **50** | 270 ohms |
| Zener diodes **52** and **54** | 1N751 |
| diode **56** | 1N914 |
| resistors **60** and **64** | 6.8K ohms |
| resistor **68** | 33K ohms |
| transistors **62** and **66** | MJE371 |

Figure 5:
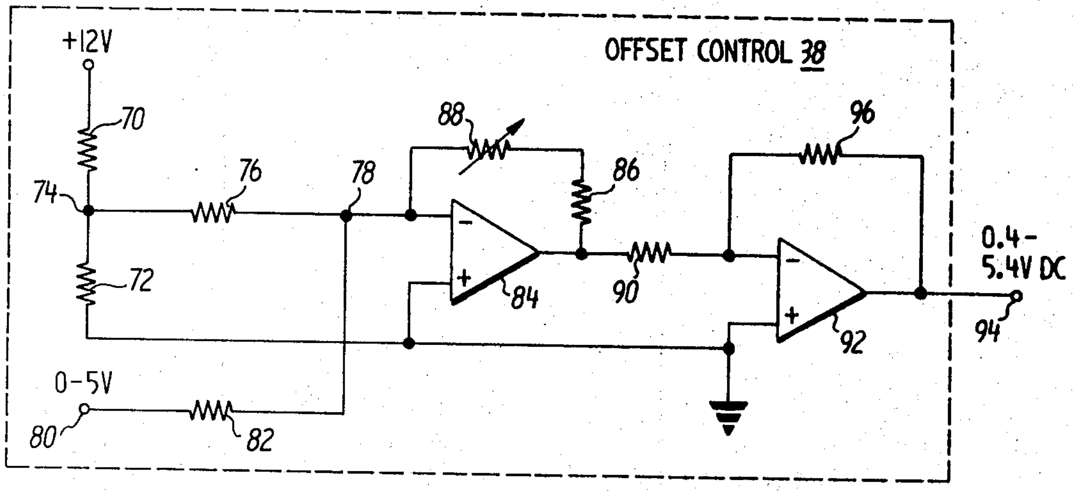

With reference now to FIG. 5, the offset control circuit 38 of FIG. 1 includes a voltage divider comprising resistors 70 and 72 connected in series between a source of positive 12 volt potential and ground. The terminal 74 interconnecting the resistors 70 and 72 is connected through a resistor 76 to a terminal 78 to which may also be applied the control voltage by way of an input terminal 80 and a resistor 82. The terminal 78 may be directly connected to the negative or inverting terminal of a suitable conventional comparator or differential amplifier 84. The output terminal of the amplifier 84 may be connected by way of a resistor 86 and a potentiometer 88 to the inverting or negative input terminal to provide negative feedback and the positive or noninverting input terminal may be grounded. The output signal from the amplifier 84 may also be applied through a resistor 90 to the negative input terminal of a suitable conventional comparator or differential amplifier 92. The positive or non-inverting terminal of the amplifier 92 may be grounded and the output terminal connected to the terminal 94 of the comparator 36 of FIG. 1 and to the inverting input terminal of the amplifier 92 through a resistor 96.

In operation, the voltage divider comprising resistors 70 and 72 provides an offset for the comparator 84. This offset exceeds the minimum operational limits of the comparator 84 and is desirably on the order of 0.45 volts. This offset voltage is summed with a 0–5 volt control voltage applied to the terminal 80 at the inverting input terminal 78 of the comparator 84. The potentiometer 88 provides an open range adjustment and the amplifier 92 together with the resistor 90 and the feedback resistor 96 provides for inversion of the output of the amplifier 84 and this compatability with the amplifier 36 of the circuit of FIG. 1.

Exemplary values for the various circuit components of the circuit of FIG. 5 are as follows:

| | |
|---|---|
| resistor **70** | 3K ohms |
| resistor **72** | 100 ohms |
| resistors **76, 82, 90** and **96** | 10K ohms |
| resistor **86** | 8.2K ohms |
| potentiometer **88** | 5K ohms |

ADVANTAGES AND SCOPE OF THE INVENTION

By means of the method and circuit of the present invention as above described, an offset may be provided to ensure the reliable operation of the comparator and compensation for the offset made in the duration of the output pulse. The width of the output pulse of the circuit of the present invention may thus be variable from zero to a predetermined maximum in response to a control voltage from zero to a predetermined maximum. Reliability and linearity in a zero minimum width variable pulse width multivibrator is thus achieved.

The present invention may be embodied in other specific forms without departing from the spirit or essential characteristics thereof. For example, the JK flipflop may be replaced by any suitable conventional binary element as may the transistor 24 and capacitor 30 respectively by other suitable electronic switching devices and an integrator. Likewise, any suitable conventional constant current source may be substituted for the source described in detail in connection with FIG. 4. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A circuit for providing a pulse selectively variable from zero to a predetermined maximum comprising:
means responsive to a trigger signal for providing a first signal having a substantially constant amplitude and a predetermined duration;
means responsive to a trigger signal and to a control signal for providing a second signal having a substantially constant amplitude and having a duration related to the sum of said predetermined duration and a duration related to the value of the control signal;
first circuit means for simultaneously applying a trigger signal to said first signal providing means and to said second signal providing means;
second circuit means for applying a control signal to said second signal providing means, said control signal being selectively variable in value from zero to a predetermined maximum; and,
means responsive to said first signal providing means and to said second signal providing means for providing an output signal having a substantially constant amplitude and a duration variable from zero to a predetermined maximum as a sole function of the value of said control signal.

2. The circuit of claim 1 wherein the value of said control signal is voltage; and,
wherein said second signal providing means includes:

a source of substantially constant current,
means for integrating current from said source to provide a voltage increasing at a substantially linear rate from zero,
binary means responsive to a trigger signal for operatively connecting said source to said integrating means when in a first condition, and
comparing means responsive to said control voltage and to said variable voltage for changing the condition of said binary means.

3. A monostable multivibrator for producing a pulse variable in duration from zero to a predetermined value as a function of a control signal comprising:
means for providing a control signal;
means responsive to a trigger signal and to said control signal providing means for providing a first pulse having a duration not less than a predetermined value and related to the value of the control signal;
means responsive to a trigger signal for providing a second pulse commencing concurrently with the commencement of said first pulse and having a duration less than that of said first pulse and related to said predetermined value; and,
means responsive to said first and second pulses for providing a third pulse having a duration related to the difference in the duration of said first pulse and the duration of said second pulse.

4. The monostable multivibrator of claim 3 wherein said first pulse providing means includes a monostable multivibrator; and,
wherein said second pulse providing means includes a ramp generator and a comparator, said ramp generator being responsive to said trigger signal, said comparator being responsive to said ramp generator and to said control signal.

5. The monostable multivibrator of claim 4 including means for biasing said comparator to provide an output signal equal to said predetermined value in the presence of a control signal having zero value, said predetermined minimum being not less than the minimum operating limit of said comparator.

6. A method for providing a pulse having a duration selectively variable linearly from zero to a predetermined value comprising the steps of:
a. providing a control signal having a predetermined minimum value;
b. initiating a first signal variable in duration from a predetermined minimum value to a value related to the sum of the predetermined minimum value and the value of the control voltage;
c. initiating a second signal concurrently with the initiation of the first signal, the second signal having a duration related to the predetermined minimum value; and,
d. providing an output signal related to the difference in duration of the first and second signals, the output signal being thereby variable in duration from zero to a value related to the value of the control signal.

7. A method of providing a pulse of selectively variable width comprising the steps of:
a. providing a control signal selectively variable from a value related to a predetermined minimum pulse width to a predetermined maximum;
b. providing in response to the control signal a first pulse;
c. providing a second pulse having a predetermined pulse width; and,
d. subtracting the second pulse from the first pulse to thereby provide a selectively variable width.

8. A method of providing a pulse selectively variable in width from zero to a predetermined value in response to a trigger signal comprising the steps of:
a. providing a first pulse having a predetermined width and substantially constant amplitude in response to a trigger signal;
b. initiating a second substantially constant amplitude pulse responsively to the trigger signal;
c. providing a time varying signal in response to the trigger signal;
d. comparing the time varying signal with a signal related in value to the selected pulse width;
e. terminating the second pulse responsively to the comparison of the time varying signal; and,
f. subtracting the first pulse from the second pulse to provide an output pulse having a substantially constant amplitude and a duration related to the control signal.

* * * * *